United States Patent [19]

Lowell

[11] 4,255,402

[45] Mar. 10, 1981

[54] SULPHUR DIOXIDE GAS SCRUBBING PROCESS

[76] Inventor: Philip S. Lowell, 6307 Shoal Creek West, Austin, Tex. 78731

[21] Appl. No.: 66,008

[22] Filed: Aug. 13, 1979

[51] Int. Cl.³ .............................................. C01B 17/00
[52] U.S. Cl. ................................... 423/242; 423/539; 423/551
[58] Field of Search .......... 423/242 A, 242 R, 244 A, 423/244 R, 512 A, 539, 551

[56] References Cited

U.S. PATENT DOCUMENTS

| | | | |
|---|---|---|---|
| 3,617,212 | 11/1971 | Shah | 423/242 |
| 3,650,692 | 3/1972 | Villiers-Fisher | 423/242 |
| 3,687,624 | 8/1972 | Terrana et al. | 423/242 |
| 3,971,844 | 7/1976 | Schneider | 423/242 |
| 4,178,348 | 12/1979 | Asanagi et al. | 423/242 |

Primary Examiner—O. R. Vertiz
Assistant Examiner—Gregory A. Heller
Attorney, Agent, or Firm—Rudolph L. Lowell; Richard L. Hansen

[57] ABSTRACT

Sulfur dioxide is removed from a gas stream by contacting the gas with an aqueous solution containing sulfite anion, magnesium cation, and one or more other cations whose sulfite salts are more soluble than magnesium sulfite. The contacting solution is regenerated with magnesium oxide or hydroxide and then recycled.

9 Claims, 1 Drawing Figure

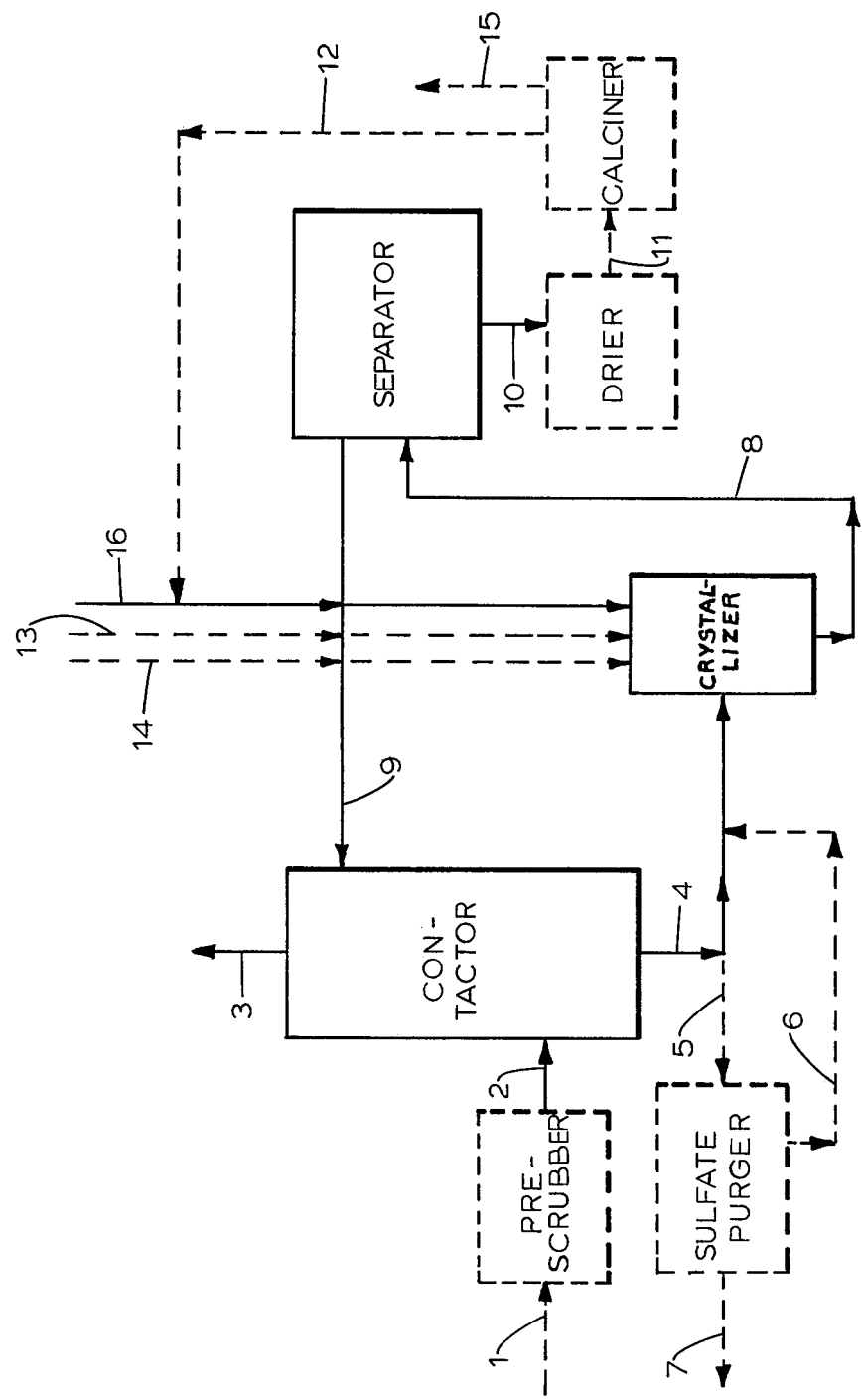

SULPHUR DIOXIDE GAS SCRUBBING PROCESS

BACKGROUND OF THE INVENTION

This invention relates to a chemical process for removing sulfur dioxide from a sulfur dioxide-containing gas stream; more specifically, the process comprises contacting the gas with an aqueous sulfite solution containing sulfite anion, magnesium cation, and one or more other cations, converting sulfur dioxide and sulfite to bisulfite, and then regenerating the solution with magnesium oxide or hydroxide, separating magnesium sulfite from the regenerated solution, and recycling the aqueous sulfite solution.

The removal of sulfur dioxide from various gas streams has been extensively investigated. In spite of intensive efforts, more effective methods are still needed. This is especially so when the gas stream is waste gas, such as flue gas from combustion of a sulfur-containing fuel, e.g., coal, in a commercial steam power plant. Such flue gas is produced in large volumes at near atmospheric pressure and generally contains only about 0.04 to 0.5 percent (400 to 5000 ppm) sulfur dioxide. Simply handling and treating large gas volumes requires a substantial capital investment, and the expense is compounded when the treatment is inefficient in removing sulfur dioxide. An impediment to development of more effective means of sulfur dioxide removal has been the limited value of the by-products recoverable in the processes commonly in use today.

Since enactment of the Clean Air Act of 1971 and recognition that human exposure to sulfur dioxide levels of the order of 0.1 ppm causes adverse health effects, renewed efforts have been made to find a technically and economically feasible means to remove sulfur dioxide from sulphur dioxide-containing gas streams, such as flue gas.

Methods developed for removing sulfur dioxide from gas streams are described in the prior art, e.g., Riesenfeld and Kohl, "Gas Purification," Second Ed., Gulf Publishing Co., Houston, Texas, 1974, pp 262–341. Removal processes can be classified in various ways. For example, some of the processes trap and convert the gaseous sulfur dioxide to a solid, which itself is a waste material and requires disposal. Among such processes is the reaction of the sulfur dioxide with aqueous lime or limestone slurries, producing calcium sulfite or sulfate. Sorption in such nonregenerable slurries is the most common method now used for flue gas desulfurization.

Regenerable processes, on the other hand, permit regeneration of the contacting medium and, in some cases, optional recovery and beneficial use of the sulfur dioxide as well. Regenerable processes have obvious ecological advantages.

Many of the sulfur dioxide processes are based upon acid-base reactions. The acid gas, $SO_2$, may react with a base in the dissolved aqueous phase, e.g. sulfite ion, or with a solid phase base, e.g. $MgSO_3 \cdot 3H_2O$. The dissolved aqueous phase base, e.g. sulfite ion, is much more readily available and hence is much more desirable.

In several regenerable processes known in the art, sulfur dioxide is removed from the sulfur dioxide-containing gas stream by contacting the gas with an aqueous solution or slurry in which the following chemical reaction takes place:

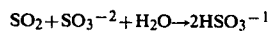

$$SO_2 + SO_3^{-2} + H_2O \rightarrow 2HSO_3^{-1}$$

Regeneration of the sulfite solution or slurry from the bisulfite is effected as described below. The desirability of such processes depends upon the efficiency with which the sulfur dioxide is trapped in the sorption reaction, which in turn depends on the sulfite concentration, and the ease of regenerating the contacting medium. The result of inefficiency in either reaction is that more of the scrubbing medium must be handled, or more energy must be supplied, thereby increasing the cost of sulfur dioxide removal—larger and longer lines, bigger tanks, pumps, higher temperatures, more electricity, etc.

In processes employing the aforesaid chemistry it is often desirable to remove hydrogen chloride and particulate matter, such as fly ash, from the gas stream before contacting it and to purge sulfate, an oxidation product, from the contacting medium. The presence of chloride and sulfate anions in the contacting medium decreases the amount of sulfite anion which may be present. Since the gas stream is humidified in the process, it is necessary to add makeup water to the contacting medium from time to time to compensate for losses.

One of the regenerable processes of the prior art employs a homogeneous potassium (more recently sodium) sulfite solution as the contacting medium. The Wellman-Lord process, described, for example, in Riesenfeld and Kohl, loc. cit., pp 313–315, is potentially very efficient in the sorption reaction, since sodium and potassium sulfite are quite soluble in water. However, regeneration is accomplished by heating the spent bisulfite-containing solution to drive off the sulfur dioxide, and the regeneration is inefficient. The result is that the Wellman-Lord contacting medium generally contains only about 0.25 gram-mole/liter sulfite.

In variations of the Wellman-Lord process, e.g., the double alkali process (see, for example, Journal of the Air Pollution Control Association, 27, 958 (1977)), the sulfite contacting medium is regenerated by treating the spent bisulfite-containing solution with lime, but the resulting calcium sulfite and calcium sulfate constitute solid byproducts requiring disposal.

Another process well known in the art employs a slurry of magnesium sulfite as the contacting medium, regeneration being effected by treating the spent bisulfite-containing slurry with magnesium oxide or hydroxide (see, e.g., U.S. Pat. No. 3,577,219; U.S. Pat. No. 3,617,212; U.S. Pat. No. 3,653,823; and U.S. Pat. No. 3,826,812). Part of the bisulfite is regenerated to soluble sulfite. The remainder is precipitated as magnesium sulfite solid. Some of the magnesium sulfite solid is separated and may be dried and calcined (see U.S. Pat. No. 3,681,020) to magnesium oxide, which is recycled to the process, and sulfur dioxide, which may be used to make sulfuric acid, etc. The regeneration in the magnesium oxide process is an attractive feature, but the sorption reaction is inefficient. In the first place, magnesium sulfite is not very soluble, and the aqueous scrubbing medium contains only about 0.05–0.2 gram-mole/liter sulfite in solution. Inefficiency in the sorption reaction means that large quantities of the slurry are required. In addition, circulating a slurry causes wear on equipment through erosion, scaling, clogged orifices, etc.

None of the commercial regenerable processes is efficient in both the sorption and regeneration processes, and because of the large volumes of gas generated, requiring treatment with huge volumes of contacting medium, none of the processes of the prior art is adaptable to removing sulfur dioxide from power plant flue gas economically.

Thus, it is an object of this invention to provide a regenerable sulfite sorption process which removes sulfur dioxide effectively, efficiently and economically from a sulfur dioxide-containing gas stream. It is a further objective to provide, within the context of the aforesaid process, a regeneration which is efficient in converting bisulfite to sulfite, while producing an essentially sulfate-free magnesium sulfite, which can be economically transformed into magnesium oxide for recycling. Other advantages will be apparent to those skilled in the art to whom this application is directed.

SUMMARY OF THE INVENTION

According to this invention, a regenerable process is provided for removing sulfur dioxide from a sulfur dioxide-containing gas stream; for example, flue gas resulting from the combustion of a sulfur-containing fuel. In one embodiment, the process comprises (i) contacting the gas with an aqueous sulfite solution characterized by a sulfite anion concentration sufficient to produce an alkalinity of 0.2 to 4.0, magnesium cation in an amount to substantially saturate the solution with respect to magnesium sulfite, and one or more other cations whose sulfite salts are more soluble than magnesium sulfite, thereby sorbing sulfur dioxide, and converting sulfur dioxide and sulfite to bisulfite; (ii) treating the bisulfite-containing solution with magnesium oxide or hydroxide, thereby reconverting bisulfite to sulfite, precipitating magnesium sulfite, and regenerating the solution; (iii) separating precipitated magnesium sulfite from the regenerated solution; and (iv) recycling and reusing the resulting aqueous sulfite solution for scrubbing the gas.

In other preferred embodiments, there are provided modifications of the aforesaid process in which the separated magnesium sulfite is dried and calcined, thereby regenerating magnesium oxide, which may be recycled to step (ii) of the aforesaid process if desired, and optionally recovering sulfur dioxide. The sulfur dioxide stream obtained from calcining the magnesium sulfite, whether or not the magnesium oxide is recycled, can optionally be fed to auxiliary processing units and made into sulfuric acid, elemental sulfur, etc. by methods known in the art.

In the preferred embodiments of the aforesaid process, the aqueous sulfite is a homogeneous solution; that is a single liquid phase is present, there is essentially no suspended solid. In other embodiments the aqueous sulfite solution may contain some suspended magnesium sulfite, oxide, hydroxide, or mixtures thereof. The use of a homogeneous aqueous sulfite solution in the aforesaid process provides the basis for yet additional modifications, which are incorporated in preferred embodiments.

For example, whereas a desirable addition to the aforesaid process, whether the aqueous sulfite solution is homogeneous or heterogeneous, in provision for purging sulfate from at least part of the bisulfite-containing solution, this purge is carried out in an especially facile and preferred fashion when the aqueous sulfite solution is homogeneous and the cation other than magnesium is sodium. Under these circumstances, sulfate is purged from at least part of the bisulfite-containing solution by precipitating and separating anhydrous sodium sulfate or sodium sulfate decahydrate therefrom. An added benefit is that the water adherent to the separated salt provides a convenient chloride purge.

Use of a homogeneous aqueous sulfite solution also permits removal of particulate matter by simply filtering the bisulfite-containing solution before step (ii) of the aforesaid process.

Other embodiments provide, within the context of the basic process, for prescrubbing the sulfur dioxide-containing gas stream with an aqueous medium, thereby removing particulate matter and hydrogen chloride, as well as saturating the gas stream with water. When employed, the prescrubber ordinarily will treat the gas stream before step (i) of the aforesaid process is carried out.

In addition, it is provided to add as necessary to the bisulfite-containing solution makeup salt consisting of one or more sulfites other than magnesium sulfite, or sulfite precursors, in the amount necessary to compensate for losses and maintain the characteristics of the aqueous sulfite solution. When it is desired to add sodium sulfite, it is preferred to add instead either sodium hydroxide or sodium carbonate, preferably sodium carbonate, which produce sodium sulfite in the contactor. Although the makeup salt can be added at several different points, it is preferred that it be added in step (ii) of the aforesaid process with the magnesium oxide or hydroxide.

Various advantages and novel features which characterize the invention are particularly pointed out in the appended claims. However, for a better understanding of the invention, its advantages, and the objectives to be attained by its use, reference should be made to the drawing and to the following description.

BRIEF DESCRIPTION OF THE DRAWING

The FIGURE is a schematic flow diagram illustrating a preferred embodiment of the process of this invention and includes optional features. The optional features are illustrated in broken line. The various streams of materials, gas, liquid, or solid, are identified by number. Major equipment is identified with arbitrary, functional names.

DETAILED DESCRIPTION OF THE INVENTION

The source of the sulfur dioxide-containing gas stream for this process is not important. The process is especially useful, however, for removing sulfur dioxide from waste gas streams, e.g., the flue gas resulting from the combustion of a sulfur-containing fuel, such as coal, in a power plant. Such gas streams typically contain about 0.04 to 0.5 percent sulfur dioxide by volume. This process preferably is employed on such gas streams, and when so employed, the process in one pass readily removes at least 90 percent of the sulfur dioxide. The process is effective, however, in removing sulfur dioxide from gas streams containing between about one part per billion and 100 percent sulfur dioxide.

The temperature of the gas stream entering the contactor is not critical, but it should preferably be below the boiling temperature and above the freezing temperature of water, and temperatures in the range 100° F. to 160° F. are desirable, with about 120° F. to 140° F. preferred. The gas stream can be conditioned to a suitable temperature before contacting if necessary.

The process of this invention utilizes several pieces of standard equipment. Referring to the FIGURE, these are a contactor, a crystallizer, and a separator. Certain embodiments of the invention also utilize a prescrubber, a sulfate purger, a drier, and a calciner. All of this equipment is available commercially and is well known in the art. There are a number of variations of some of the pieces of equipment, but the process is not critically dependent upon which variations are employed. The size of each item of equipment depends upon the composition and flow rate of the input gas stream, but selecting the type and sizing the equipment for a particular input gas stream is within the skill of the art. For example, see Riesenfeld and Kohl, loc. cit., especially pp 1–21.

Referring now to the FIGURE, sulfur dioxide-containing gas stream 2 enters the contactor, where it is contacted with the aqueous sulfite solution for a time sufficient to convert some to nearly all of the sulfite or bisulfite. The aqueous sulfite solution, generally at a temperature of about 100° F. to 160° F., but between about 60° F. and 200° F. when the other cation is sodium, preferably about 120° F. to 140° F., contains (1) a sulfite anion concentration sufficient to produce an alkalinity of 0.2 to 4.0, (2) magnesium cation in an amount to substantially saturate the solution with respect to magnesium sulfite, and (3) one or more other cations whose sulfite salts are more soluble than magnesium sulfite.

Wherever the term "alkalinity" of the aqueous sulfite solution is referred to herein, that term means the number of gram moles of hydrogen chloride required to be added to reduce the pH of one liter of the solution to 4.0. The alkalinity of the solution can in general be increased by adding soluble sulfite to the solution.

In order to achieve a solution alkalinity of 0.2 to 4.0, it is provided that the solution contain one or more selected cations other than magnesium, thereby allowing the magnesium cation concentration to remain relatively low, while permitting the sulfite concentration to be increased. In this manner, the capacity of the contacting medium to sorb sulfur dioxide, as measured by the alkalinity, is dramatically enhanced. In order to be useful in this invention, the sulfite salts of such other cations should be more soluble than magnesium sulfite. A number of suitable cations can be selected by reference to tables of solubilities; for example, "Solubilities," W. F. Linke, Editor, 4th Ed., American Chemical Society, Washington, D.C. 1965, which reports the solubility of sodium sulfite as 37.5 gm/100 gm of water at 40° C., for example. Suitable cations include ammonium, sodium, potassium, lithium, cesium, rubidium, and zinc. Among these, sodium is preferred because sodium salts are inexpensive, nontoxic and readily available. Combinations of such cations, e.g., sodium and potassium, may be advantageously employed to achieve optimum alkalinity and cost.

The measurement of pH provides convenient means of controlling the magnesium oxide or hydroxide addition in step (ii) of the process. In solutions having a pH greater than about 7.5 most of the bisulfite has been regenerated to sulfite. The total sulfur in the plus four oxidation state (sulfite, bisulfite, unionized sulfurous acid, etc) may be determined by iodimetry. See, for example, Kolthoff and Sandell, "Testbook of Quantitative Inorganic Analysis," 3rd Ed., McMillan Co., New York, N.Y., 1952, pp 585–596. In the concentration and pH range of interest, the sulfite anion concentration so approximately determined in gram-moles/liter and the alkalinity of the aqueous sulfite solution are nearly identical. Thus, the aqueous sulfite solutions of this invention are characterized either by containing 0.2 to 4.0 gram-moles/liter sulfite anion or sufficient sulfite anion to produce an alkalinity of 0.2 to 4.0.

Examples 1–9 illustrate the composition of aqueous sulfite solutions within the contemplation of this invention and, for comparison, Examples 10 and 11 represent the solution portion of the contacting media of the prior art magnesium oxide process. The enhanced capacity of the aqueous sulfite solutions of this invention to sorb sulfur dioxide, reflected in either the alkalinity or sulfite concentration, is evident.

| EX. | MAKEUP COMPONENTS (Gram-Moles/Liter) | | | | | | PROPERTIES | | |
|---|---|---|---|---|---|---|---|---|---|
| | $Na_2SO_3$ | $Na_2SO_4$ | NaCl | $K_2SO_3$ | $MgSO_3$ | $MgSO_4$ | $SO_3^{-2}$ [a] | alk.[b] | pH |
| 1 | 1.6 | | | | sat.[c] | | 0.746 | 0.645 | 7.71 |
| 2 | sat. | | | | sat. | | 1.83 | 1.79 | 9.47 |
| 3 | sat. | 0.5 | | | sat. | | 1.22 | 1.19 | 8.98 |
| 4 | sat. | 0.5 | 0.5 | | sat. | | 1.64 | 1.61 | 9.01 |
| 5 | sat. | | 2.0 | | sat. | | 1.25 | 1.23 | 8.94 |
| 6 | 0.4 | | | | sat. | | 0.252 | 0.234 | 7.77 |
| 7 | sat. | 2.0 | | | sat. | | 0.722 | 0.695 | 8.52 |
| 8 | | | | sat. | sat. | | 3.82 | 3.79 | 11.81 |
| 9 | sat. | | | 2.0 | sat. | | 2.83 | 2.81 | 9.87 |
| 10[d] | | | | | sat. | | 0.079 | 0.080 | 8.82 |
| 11[d] | | | | | sat. | 2.0 | 0.140 | 0.170 | 8.12 |

[a] gram-moles/liter; determined by iodimetry.
[b] alkalinity; gram-moles of HCl per liter to reduce pH to 4.0.
[c] sat. means saturated.
[d] not aqueous sulfite solution of this invention.

One of the advantages of the present invention is that much less contacting medium is required to remove sulfur dioxide from a given volume of gas, resulting in reductions in both capital cost and operating expenses. McGlamery, et al., EPA-600/2-75-006, U.S. Government Printing Office, January 1975, have disclosed the amount of contacting medium required to remove 90% of the sulfur dioxide from 1000 cubic feet of flue gas produced by a new 500 megawatt coal-fired power plant burning coal containing 3.5 weight percent sulfur. Those results appear in Example 12 for various types of prior art contacting media. The result for the process of this invention, as set forth in Example 13 below, under the same design parameters, also appears in Example 12. The magnesium oxide process of the prior art requires approximately fifty times more contacting medium than the process of this invention.

EXAMPLE 12

| CONTACTING MEDIA REQUIREMENTS | |
|---|---|
| PROCESS | AMOUNT REQUIRED (gal./1000 ft³) |
| This invention | 0.38 |
| Wellman-Lord (Na) | 3 |
| Magnesium oxide | 20 |
| Lime | 40 |
| Limestone | 70 |

The adverse effect of chloride ion on the effectiveness of the aqueous sulfite solution is demonstrated by comparing the alkalinity of the Example 2 and 5 solutions. Thus, the process of this invention is optionally, but preferably, provided with means to remove chloride ion from the aqueous sulfite solution or prevent chloride from entering it. For example, the process can be provided with a prescrubber to remove hydrogen chloride from the raw gas stream, along with particulate matter, such as fly ash, while also saturating the gas stream with water. With reference to the FIGURE, raw gas stream 1 is fed to a prescrubber. Such prescrubbers are well known in the art. For example, the raw gas stream can be prescrubbed with an aqueous medium in a venturi scrubber with lime or limestone added for pH control.

The prescrubbed gas stream leaves the prescrubber as stream 2, enters the contactor, and is contacted with the aqueous sulfite solution described above. Sulfur dioxide from the gas stream is sorbed by the aqueous sulfite solution, and the purified gas stream exits from the contactor as stream 3. The sorbed sulfur dioxide reacts with sulfite, producing bisulfite.

The bisulfite-containing solution leaves the contactor as stream 4, generally at a temperature of about 120° F. to 140° F., and enters the crystallizer, which can be a tank provided with agitation. The bisulfite-containing solution is treated in the crystallizer with magnesium oxide or hydroxide, stream 16. This converts the bisulfite to sulfite, precipitates a solid, hydrated magnesium sulfite, and regenerates the contacting solution according to the following reaction:

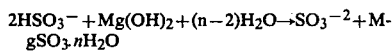

$$2HSO_3^- + Mg(OH)_2 + (n-2)H_2O \rightarrow SO_3^{-2} + MgSO_3 \cdot nH_2O$$

The heat of reaction will tend to increase the temperature. The hydration number, n, is usually three or six. The conditions producing these hydrates are discussed by Lowell et al., EPA-600/7-77-109, U.S. Government Printing Office, September 1977.

The regenerated solution, at a temperature in the range 120° F. to the boiling temperature of the solution, containing precipitated magnesium sulfite and, in some cases, unreacted solid magnesium oxide and/or hydroxide, is fed from the crystallizer as stream 8 to a separator, where the solids are separated from the regenerated solution. This separation may be effected in two stages, e.g., with a thickener and a centrifuge, and utilizes equipment and techniques well known in the art. Although it is not necessary, it is preferred that essentially all of the solid is separated from the regenerated solution, so that the aqueous sulfite solution, which emerges from the separator as stream 9 and is recycled to the contactor, is a homogeneous solution as defined above. It is also desirable to remove as much of the adherent liquid as possible from the solid in order to minimize the amount of salt other than magnesium sulfite going to the driers. The separated magnesium sulfite, together with unreacted magnesium oxide and/or hydroxide, is removed from the separator as stream 10.

There are a number of advantages in employing a homogeneous solution, rather than a heterogeneous solution or slurry, as the scrubbing medium. For example, the rubber-lined equipment required to minimize wear from slurry abrasion is not necessary and standard flow control valves can be used. The use of a homogeneous aqueous sulfite solution also permits any particulate matter, such as fly ash, in the input gas stream and entrained in the solution to be removed by simply filtering the bisulfite-containing solution between the time it leaves the contactor and enters the crystallizer. This is impractical when the scrubbing medium is a heterogeneous solution or slurry.

Comparison of the alkalinity of the solutions of Examples 3 and 7 with the alkalinity of the Example 2 solution demonstrates the adverse effect of increased sulfate concentration on the efficiency of the aqueous sulfite solution. Thus, there are provided optional methods for purging sulfate from at least part of the bisulfite-containing solution. When the aqueous sulfite solution is homogeneous, sulfate may be purged from the bisulfite-containing solution by the electrolytic method disclosed by Humphries, et al., in *Chem. Eng. Prog.*, 67, 64 (1971), which disclosure is incorporated herein by reference. If the only cation in the homogeneous aqueous sulfite solution, other than magnesium, is sodium, it is possible to purge sulfate from the bisulfite-containing solution as either anhydrous sodium sulfate, e.g., by concentrating a portion of the solution and precipitating and separating the anhydrous sodium sulfate therefrom, or as sodium sulfate decahydrate, e.g., by cooling a portion of the solution. Referring to the FIGURE, a portion of stream 4 is cycled as stream 5 through a sulfate purger. The purged solution emerges as stream 6 to rejoin stream 4. When purging sulfate by precipitating sodium sulfate decahydrate, the preferred method, the precipitation may be effected by cooling the solution, e.g., to about 40° F.; the precipitate can be separated by filtration and emerges as stream 7. When the aqueous sulfite solution is heterogeneous, the aforesaid techniques for purging sulfate will be applied to a portion of the bisulfite-containing solution from which the solid has been separated, e.g., by filtration. An added benefit is that chloride, if not otherwise removed as described above, is simultaneously purged from the expended solution in the liquid adhering to the separated salt.

The magnesium sulfite, led from the separator as stream 10, is optionally dried in a drier of standard design and thence is led to a calciner where magnesium oxide is regenerated from the magnesium sulfite and sulfur dioxide is recovered. Any magnesium oxide or hydroxide with the magnesium sulfite also enters the calciner as stream 11, all yielding magnesium oxide, which leaves the calciner as stream 12. Stream 12 can optionally be recycled to the process. The solid entering the calciner should be freed as much as possible of sulfites other than magnesium, e.g., by removing as much of the adherent liquid from the solid as practical.

Calcining essentially sulfate-free magnesium sulfite is less expensive than if sulfate is present. If the magnesium sulfite contains magnesium sulfate, as it does in the prior art, the calciner must be operated at a temperature above the decomposition temperature of magnesium sulfate (about 1000° C.). Magnesium sulfite can be decomposed at 360°–550° C., in an oxidizing calciner requiring less fuel and producing a more concentrated sulfur dioxide stream. Sulfur dioxide, exiting the calciner as stream 15, can be fed to other processes requiring it. By decomposing magnesium sulfite in a reducing calciner elemental sulfur may be produced.

After the process of this invention has operated for a time, it may be necessary to add makeup water, as well as one or more other cation sulfites or sulfite precursors to compensate for ordinary process and other inadvertent losses, as well as the sulfate purge. For this purpose, streams 13 and 14 are led to the process, at the crystalizer as shown, or another point. Streams 14 and 13 makeup sulfite or sulfite precursor and water, respectively. WWater could enter the process in several places such as pump seals and centrifuge wash water. Among the sulfite precursors which can be used, carbonates and hydroxides are attractive. When the other cation is sodium, sodium carboate is preferred.

EXAMPLE 13

The process of this invention, incorporating optional and preferred features illustrated in the FIGURE, is employed to remove 90 percent of the sulfur dioxide from the flue gas stream containing 2200 ppm sulfur dioxide resulting from burning a coal containing 3.5 percent by weight sulfur in a 500 megawatt power plant. The following flow rates of the various process streams are observed:

| STREAM | COMPONENT (Lb.-Moles/Min.) | | | | | | | | | TEMP. (°F.) |
|---|---|---|---|---|---|---|---|---|---|---|
| | $N_2$ | $CO_2$ | $O_2$ | $H_2O$ | $SO_2$ | $NO_2$ | HCl | | | |
| 1 | 2004 | 337 | 131 | 209 | 5.91 | 1.61 | 0.27 | | | 310 |
| 2 | 2004 | 338 | 131 | 441 | 5.73 | 1.61 | 0.03 | | | 125 |
| 3 | 2004 | 338 | 131 | 441 | 0.59 | 1.61 | 0.00 | | | 125 |
| | $H_2O$ | $Na_2SO_3$ | $NaHSO_3$ | $Na_2SO_4$ | NaCl | $Na_2CO_3$ | $Na_2SO_4$ d. 10 $H_2O$ | $MgSO_3$ . 3 $H_2O$ | | |
| 4 | 215 | 1.27 | 10.3 | 2.10 | 2.03 | 0.00 | | | | 125 |
| 5 | 11.3 | 0.07 | 0.54 | 0.11 | 0.11 | 0.00 | | | | 125 |
| 6 | 7.51 | 0.05 | 0.39 | 0.01 | 0.08 | 0.00 | | | | 110 |
| 7 | 2.81 | 0.02 | 0.15 | 0.00 | 0.03 | 0.00 | 0.10 | | | 40 |
| 8 | 201 | 6.33 | 0.00 | 2.00 | 2.00 | 0.21 | | 5.04 | | |
| 9 | 221 | 6.33 | 0.00 | 2.00 | 2.00 | 0.21 | | | | 125 |
| | $H_2O$ | $MgSO_3$ . 3 $H_2O$ | MgO | $Na_2CO_3$ | | | | | | |
| 10 | 2.33 | 5.04 | | | | | | | | 125 |
| 11 | | 5.04[a] | | | | | | | | |
| 12 | | | 5.04 | | | | | | | |
| 13 | | | | 0.21 | | | | | | |
| 14 | 23.0 | | | | | | | | | |

[a] anhydrous $MgSO_3$

I claim:

1. A regenerable process for removing sulfur dioxide from a sulfur dioxide-containing gas stream which comprises
   (i) contacting the gas with an aqueous sulfite solution characterized by a sulfite anion concentration sufficient to produce an alkalinity of 0.2 to 4.0, magnesium cation in an amount to substantially saturate the solution with respect to magnesium sulfite, and one or more other cations whose sulfite salts are more soluble than magnesium sulfite, thereby sorbing sulfur dioxide, and converting sulfur dioxide and sulfite to bisulfite;
   (ii) treating the bisulfite-containing solution with magnesium oxide or hydroxide, thereby reconverting bisulfite to sulfite, precipitating magnesium sulfite, and regenerating the solution;
   (iii) separating precipitated magnesium sulfite from the regenerated solution; and
   (iv) recycling and reusing the resulting aqueous sulfite solution for scrubbing the gas.

2. The process of claim 1 in which said other cations are selected from ammonium, lithium, sodium, potassium, rubidium, cesium, and zinc.

3. The process of claim 1 which further comprises drying and calcining said separated magnesium sulfite, thereby regenerating magnesium oxide and recovering sulfur dioxide, or one of its reaction products.

4. The process of claim 1 in which said aqueous sulfite solution contains solid magnesium sulfite, magnesium oxide, magnesium hydroxide, or mixtures thereof.

5. The process of claim 1 in which said other cation is sodium and said aqueous bisulfite containing solution is a substantially homogeneous solution.

6. The process of claim 5 which further comprises purging sulfate from at least part of said bisulfite-containing solution by precipitating and separating sodium sulfate as an anhydrous or decahydrate salt.

7. The process of claim 1 or 5 which further comprises prescrubbing said gas stream with an aqueous medium before step (i) of said process, thereby removing particulate matter and hydrogen chloride, as well as saturating said gas stream with water.

8. The process of claim 1 or 5 which further comprises filtering said bisulfite-containing solution before step (ii) of said process, thereby removing particulate matter.

9. The process of claim 6 which further comprises drying and calcining said separated magnesium sulfite, thereby regenerating magnesium oxide and recovering sulfur dioxide.

* * * * *